(12) United States Patent
Johnson et al.

(10) Patent No.: US 7,656,957 B2
(45) Date of Patent: Feb. 2, 2010

(54) MULTIPLEXING SYSTEM FOR TIME DIVISION DUPLEX COMMUNICATION SYSTEMS

(75) Inventors: Mitch Johnson, McKinney, TX (US); George Bednekoff, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 512 days.

(21) Appl. No.: 11/471,887

(22) Filed: Jun. 21, 2006

(65) Prior Publication Data

US 2006/0291407 A1 Dec. 28, 2006

Related U.S. Application Data

(60) Provisional application No. 60/693,952, filed on Jun. 24, 2005.

(51) Int. Cl.
*H04L 27/00* (2006.01)
*H04Q 7/00* (2006.01)
(52) U.S. Cl. .................... 375/259; 370/314
(58) Field of Classification Search .......... 370/310–350, 370/276–294; 455/14, 15; 375/257, 259, 375/297
See application file for complete search history.

(56) References Cited

U.S. PATENT DOCUMENTS

| | | | |
|---|---|---|---|
| 4,554,608 A | 11/1985 | Block | |
| 5,628,052 A * | 5/1997 | DeSantis et al. | 455/562.1 |
| 5,634,191 A * | 5/1997 | Beasley | 370/279 |
| 5,818,382 A | 10/1998 | Gutwerk | |
| 6,396,823 B1 * | 5/2002 | Park et al. | 370/335 |
| 6,411,825 B1 | 6/2002 | Csapo et al. | |
| 6,560,465 B1 | 5/2003 | Han | |
| 6,701,137 B1 | 3/2004 | Judd et al. | |
| 6,801,767 B1 | 10/2004 | Schwartz et al. | |
| 2003/0040336 A1 | 2/2003 | Waylett et al. | |
| 2004/0131125 A1 | 7/2004 | Sanderford, Jr. et al. | |
| 2005/0009478 A1 * | 1/2005 | Mohan et al. | 455/102 |
| 2005/0088301 A1 | 4/2005 | Abbruscato | |

* cited by examiner

*Primary Examiner*—Seema S Rao
*Assistant Examiner*—Wanda Z Russell

(57) ABSTRACT

A method and system is disclosed for passing a transmit/receive control signal and a power signal through a coax cable from a base transceiver station to a tower top device in a time division duplex communication system. After generating the transmit/receive control signal and a radio frequency signal for communications, the transmit/receive control signal modulates a separate timing control operating on a separate control frequency. It is then multiplexed on at least one coax cable along with the radio frequency signal and DC power. At the tower top device, the modulated transmit/receive control signal is converted back to a DC level for providing a time division duplex control reference.

20 Claims, 2 Drawing Sheets

MULTIPLEXING SYSTEM FOR TIME DIVISION DUPLEX COMMUNICATION SYSTEMS

CROSS REFERENCE

The present application claims the benefits of U.S. Provisional Patent Application Ser. No. 60/693,952, which was filed on Jun. 24, 2005.

BACKGROUND

The present invention relates generally to a wireless communication system design, and more particularly to a multiplexing system for time division duplex (TDD) wireless systems that uses a coax cable for simplifying assembly of remote towers in TDD systems.

A TDD system is designed to transmit and receive on the same frequency in different time slots, the mechanism of which is well known by those skilled in the art. Various literatures have described in theory and applicable detail the TDD systems that are deployed in the telecommunications industry today (e.g., Roger Freeman, "Radio System Design for Telecommunications", Wiley-Interscience, $2^{nd}$ Edition, April 1997). TDD systems alternated between transmit or receive on the same frequency while FDD systems simultaneously transmit and receive on different frequencies.

A basic remote tower in TDD systems typically includes tower top device such as transmit and receive amplifiers and a ground device such as a transceiver. An amplifier that is placed far and away from a transceiver of the TDD system is typically called a remote amplifier. For a remote amplifier operating in TDD mode, both DC power and a transmit/receive controlsignal to indicate transmit or receive state must be fed from the transceiver to the amplifier. In transmit state, the transmit remote amplifier must be active and the receive remote amplifier must be inactive. In receive state, the receive remote amplifier must be active and the transmit remote amplifier must be inactive. This transmit/receive control signal signal, in the form of a DC level, is typically sent from the transceiver to the amplifier via a dedicated cable. However, a dedicated cable is expensive to implement and equally costly to maintain.

Alternatively, various designs allow the transmit/receive control signal to be passed wirelessly from the transceiver to the amplifier. However, if not implemented properly, aerial interference may interfere with the wireless link so much so that a high error rate, and a correspondingly costly corrective mechanism, is inevitable.

Alternatively, the DC level of the transmit/receive control signal is known to be injected directly into the RF cable that runs the length between the transceiver and the amplifier. This is accomplished by using a bias tee, which is a signal conditioning element that allows DC and RF signals to be applied to a single communication device. However, this design is problematic because the DC level change is difficult to separate from DC power injected onto the same cable. Changes in the power requirement of the remote amplifier that can cause the DC level at the remote amplifier to shift independent of the transmit/receive control signal.

For the reasons above, it is desirable to design a more reliable system that can be used for sending the transmit/receive controlsignal from the base transceiver station to the tower top amplifier.

SUMMARY

In view of the foregoing, this invention provides for TDD communication systems a multiplexing system that utilizes a coax cable per radio frequency (RF) path to pass DC power and a TDD transmit/receive control from a base transceiver station to a tower top device such as an amplifier.

According to one embodiment, after generating the transmit/receive control signal and a radio frequency signal for communications, the transmit/receive control signal modulates a separate timing control operating on a separate control frequency. It is then multiplexed on at least one coax cable along with the radio frequency signal and DC power. At the tower top device, the modulated transmit/receive control signal is converted back to a DC level for providing a time division duplex control reference.

The construction and method of operation of the invention, however, together with additional objects and advantages thereof will be best understood from the following description of specific embodiments when read in connection with the accompanying drawings.

DESCRIPTION

The present disclosure provides a detailed description of a multiplexing system that utilizes a coax cable per radio frequency (RF) path to pass DC power and a transmit/receive control signal from a base transceiver station to a tower top device such as amplifiers in a time division duplex (TDD) communication system.

Figure 1:
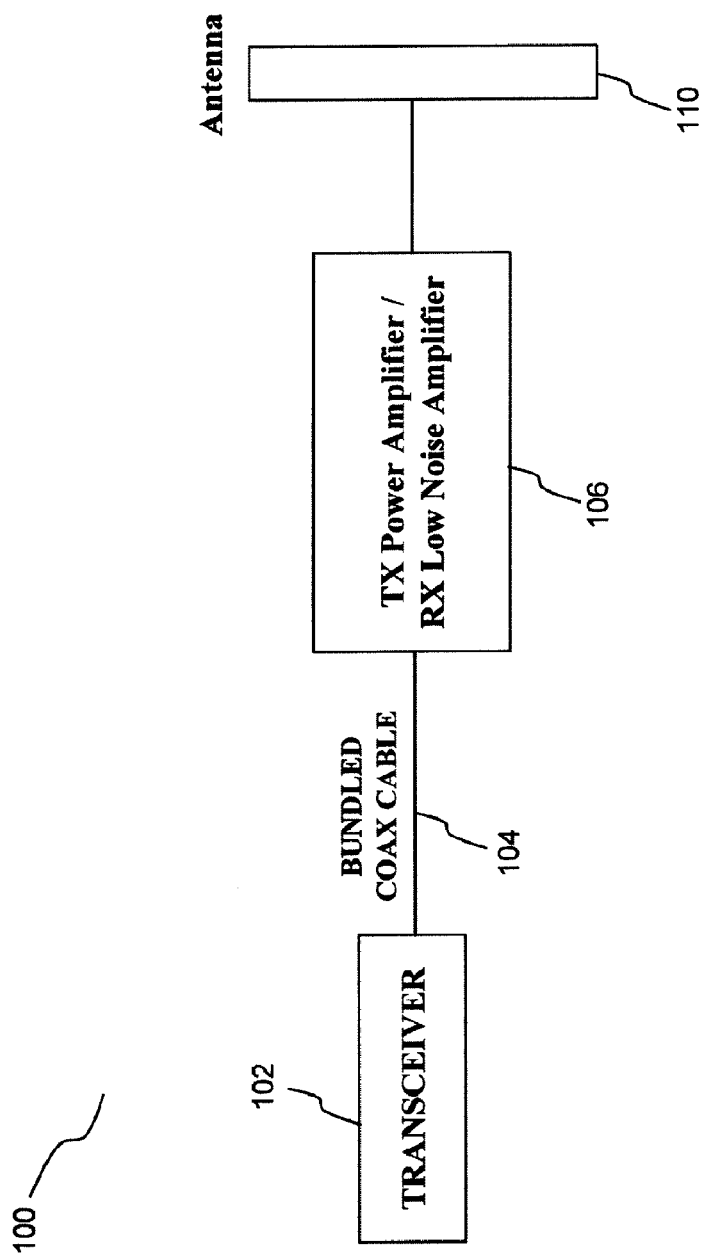
FIG. 1 illustrates a multiplexing system with a transmit/receive switching mechanism in accordance with one embodiment of the present invention.

FIG. 1 illustrates a signal multiplex system 100 in accordance with one embodiment of the present invention. The multiplexing system 100 comprises a transceiver 102, a coax cable 104, transmit and receiveamplifiers 106, and an antenna 110. In one embodiment, the transceiver 102 is a base transceiver station, while the amplifier 106 is a tower top amplifier in a TDD communication system. When installed in a communication system, the transceiver 102 is typically an element placed at the bottom of the tower, while the amplifier 106 and the antenna 110 are typically devices placed at the top of the tower or known as tower top devices. The coax cable 104 runs the physical height of the communication tower, and provides the physical link between some of the elements at the bottom of the tower and some of the elements at the top of the tower. In this invention, the coax cable 104 is designed to be used for providing TDD transmit/receive synchronization between the transceiver 102 and the amplifier 106.

This multiplexing system 100 is designed to transmit and receive on the same frequency in different time slots by using the antenna 110. The amplifier 106 is designed to be used as both a power amplifier in a transmitting mode and a low noise amplifier in a receiving mode. When the amplifier 106 is operating in a transmitting mode, a transmit/receive control signal is communicated between the transceiver 102 and the amplifier 106 via the coax cable 104. The transmit/receive control signal is a DC signal, and must be modulated in the frequency domain to be multiplexed with the RF signal. The center conductor of the coax cable 104 is a single-ended medium with the shield grounded to the chassis ground of the transceiver 102 for minimizing or eliminating electromagnetic interference (EMI) and power surge. In a transmitting mode, a TDD transmit/receive control signal modulated in the frequency domain, DC power, and the RF signal are all multiplexed into a multiplexed signal, which is carried to the amplifier 106 via the center conductor of the coax cable 104.

Figure 2:
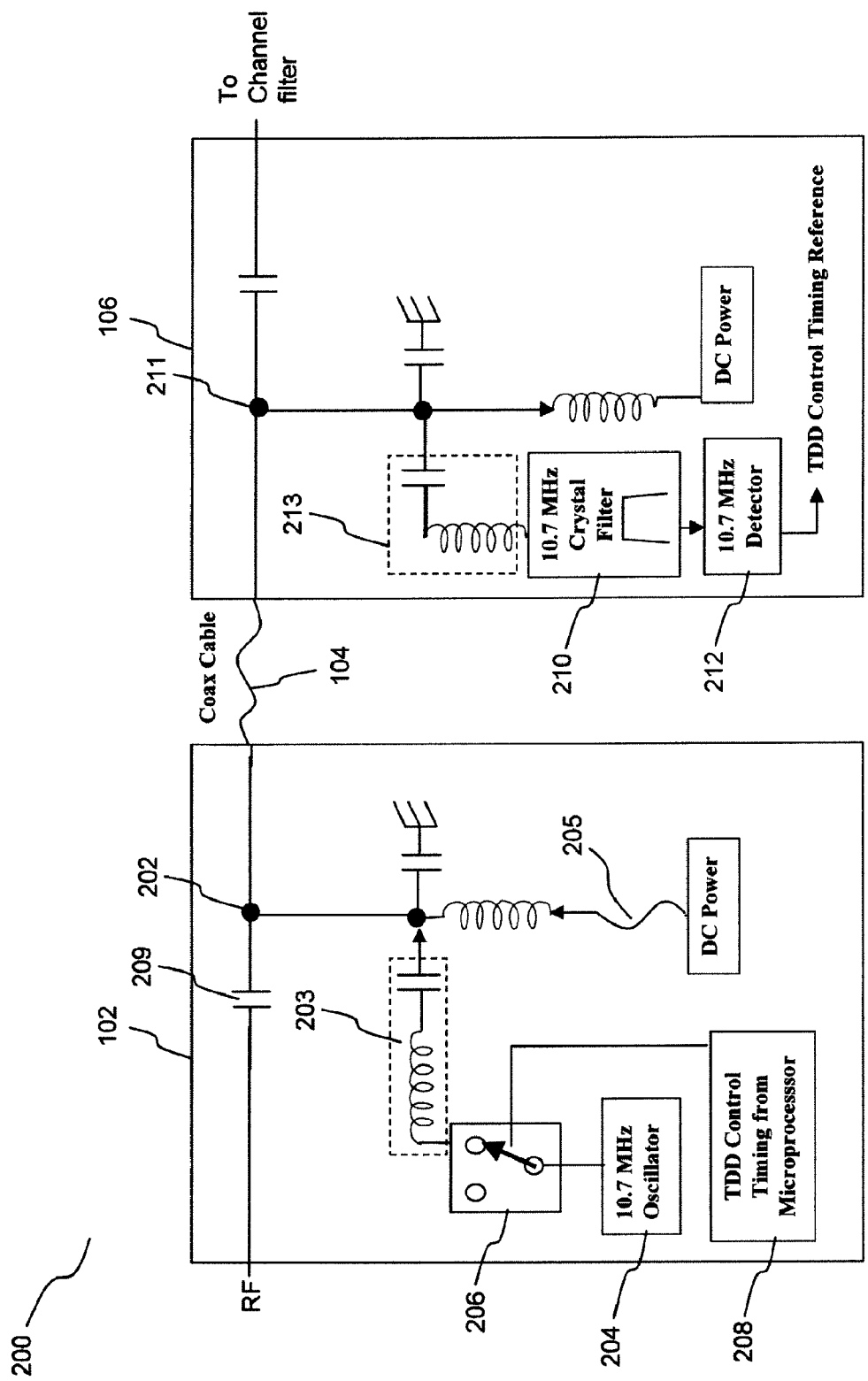
FIG. 2 illustrates a detailed view of a portion of the multiplexing system in accordance with one embodiment of the present invention.

FIG. 2 illustrates a detailed view 200 of a portion of the multiplexing system 100 in accordance with one embodiment of the present invention. The detailed view 200 includes the transceiver 102, the coax cable 104, and the amplifier module 106 discussed in FIG. 1.

The DC power signal, the TDD transmit/receive control signal modulated in the frequency domain, and the RF signal are multiplexed at a node 202, which is carried by the center conductor of the coax cable 104. An oscillator, such as a standard 10.7 MHz crystal oscillator 204, is turned on and off by a switch 206 in TDD mode to provide a timing control signal at a separate control frequency such as 10.7 Mhz that is modulated by a TDD transmit/receive control signal provided by a signal generator (such as a microprocessor 208 in the base transceiver station) for generating a modulated TDD transmit/receive control signal. This timing control signal provides a predetermined separate control radio frequency carrier that is modulated by the transmit/receive control signal (which is in the DC level) in the frequency domain. An LC element 203 may be added between the switch 206 and the node 202. The specific inductor or/and capacitor can be determined by different designs.

The DC power is fed through a fuse 205 into the node 202, while the RF signal for communications is fed, typically through an AC element 209 into the node 202. The multiplexed signal is then passed through the coax cable 104 to a node 211 of the amplifier 106. The node 211 is coupled, via an LC element 213, with a filtering mechanism such as a crystal filter 210 such that specific frequency energy at the separate control frequency can be filtered for driving a detector 212 that converts the carried timing control signal that is modulated by the transmit/receive control signal to a DC level signal. This DC level signal provides the basis for decoding the TDD transmit/receive control signal, which causes the transmit power amplifier to be active when that signal is in an "off" state (or not present) and causes the receive low noise amplifier to be active when that signal is in an "on" state. The capacitance in the elements 203, 205, and 209 can be quarter wave transformers to act as RF chokes that pass high current DC.

In one embodiment, the separate timing control signal, which has a low frequency compared with the RF signal, is turned on during a receiving mode and not during a transmitting mode. For example, the timing control signal is shift-keying (ON/OFF) modulated at the timing rate of the TDD sequence desired. That is, when the signal is in an "on" state, it expects to switch the receive low noise amplifier to be active, and when in an "off" state, it expects to have the transmit power amplifier to be active. This timing control signal is created from the transceiver 102, and converted by the detector 212 back into a DC shift-key sequence to complete the reference transfer from the transceiver 102 to the amplifier module 106. Because the timing control signal and the transmit RF signal for communications are not present (as there is no DC level control signal as designed for the "off" state) at the same time in the transmitting mode, they cannot mix together to generate spurious signals in the transmit power amplifier. The guard band between the transmitting and receiving is handled with RC time constants or other delay elements such that the transmitting and receiving modes will never overlap at the same time.

The inductors in the elements 203 and 205 are provided not only to carry the current but also choke out the lingering RF and 10.7 MHz energy. In other words, the combination of the inductors and capacitors on the 10.7 MHz feed not only provides a resonance at the 10.7 MHz frequency, but also chokes out any remaining RF energy.

The 10.7 MHz oscillator is chosen because, as a standard intermediate frequency for many electrical designs in the telecommunications market, crystal and ceramic filters at that frequency may be inexpensive and easily procurable. The precise nature of the TDD timing, as well as utilizing crystal oscillators and sharp ceramic filters, guarantees that the TDD timing signal will not be skewed or affected due to interference from outside sources in the air.

Note that the system configuration presented is one of multiple RF paths, where each RF path includes at least a transceiver, a coax cable, an amplifier, and an antenna. Each RF path is independent of any other RF path. In other words, if an amplifier or a coax cable is damaged, no other RF path is affected, thus yielding a gradual fail system, whereby failure in one RF path does not affect the overall operation of the underlying communication system, as opposed to a single point failure system, whereby one failure in one RF path cripples the overall operation of the underlying communication system.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A system comprising:

a base transceiver station configured to:

generate a radio frequency communications signal;

generate a transmit/receive control signal based on an operational mode of the base transceiver station, wherein the transmit/receive control signal is a DC signal that is in a first state when the base transceiver station is in a transmit mode and the DC signal is in a second state when the base transceiver station is in a receive mode;

generate a timing control signal on a predetermined control frequency that is on a different frequency than the radio frequency communications signal, wherein the timing control signal is modulated by the transmit/receive control signal; and multiplex the radio frequency communications signal with the timing control signal;

a coax cable having one end coupled to the base transceiver station and configured to carry the multiplexed radio frequency communications and timing control signals; and a remote device coupled to another end of the coax cable and configured to convert the timing control signal back to a DC signal, and activate a transmit power amplifier of the remote device when the DC signal is in the first state.

2. The system of claim 1, wherein the base transceiver station is configured to generate the timing control signal at the predetermined control frequency of about 10 MHz.

3. The system of claim 1, wherein the base transceiver station further comprises:

an oscillator configured to generate a carrier signal at the predetermined control frequency; and a switch coupled to the oscillator and configured to amplitude shift key modulate the carrier signal using the transmit/receive control signal as a modulating signal to generate the timing control signal.

4. The system of claim 1, wherein the base transceiver station is configured to generate the transmit/receive control signal as a DC signal that is not present in the first state and that is present in the second state.

5. The system of claim 3, wherein the base transceiver station further comprises at least one inductor and at least one capacitor coupled between the switch and the coax cable.

6. The system of claim 1, wherein the remote device further comprises a filter configured to pass the timing control signal.

7. The system of claim 6, wherein the remote device further comprises at least one inductor and at least one capacitor coupled between the filter and the coax cable.

8. The system of claim 1, wherein the remote device further comprises a receive low noise amplifier that is activated when the DC signal is in the second state.

9. The system of claim 1, wherein a shield of the coax cable is grounded.

10. A method comprising:

generating a radio frequency communications signal at a base transceiver station;

generating a transmit/receive control signal based on an operational mode of the base transceiver station, wherein the transmit/receive control signal is a DC signal that is in a first state when the base transceiver station is in a transmit mode and the DC signal is in a second state when the base transceiver station is in a receive mode;

generating a timing control signal on a predetermined control frequency that is on a different frequency than the radio frequency communications signal, wherein the timing control signal is modulated by the transmit/receive control signal;

transporting the timing control signal and the radio frequency communications signal to a remote device;

converting the timing control signal back to a DC signal; and, activating a transmit power amplifier of the remote device when the DC signal is in the first state.

11. The method of claim 10, wherein generating the timing control signal comprises generating the timing control signal at the predetermined control frequency of about 10 MHz.

12. The method of claim 10, wherein generating the timing control signal further comprises:

operating an oscillator configured to generate a carrier signal at the predetermined control frequency; and modulating the carrier signal using a switch coupled to the oscillator that amplitude shift key modulates the carrier signal using the transmit/receive control signal as a modulating signal to generate the timing control signal.

13. The method of claim 10, further comprising isolating the radio frequency communications signal from the timing control signal.

14. The method of claim 10, wherein converting further comprises converting the timing control signal to a DC signal using a detector.

15. The method of claim 10, and further comprising at the remote device activating a receive low noise amplifier that is activated when the DC signal is in the second state.

16. The method of claim 10, wherein generating the transmit/receive control signal comprises generating the DC signal that is not present in the first state and that is present in the second state.

17. A system comprising:

a base transceiver station configured to generate a transmit/receive control signal based on an operational mode of the base transceiver station, wherein the transmit/receive control signal is a DC signal that is in a first state when the base transceiver station is in a transmit mode and the DC signal is in a second state when the base transceiver station is in a receive mode;

an oscillator configured to generate a carrier signal;

a switch coupled to the oscillator and configured to amplitude shift key modulate the carrier signal using the transmit/receive control signal as a modulating signal to generate a timing control signal;

a coax cable having a first end that is configured to couple to the switch; and a detector coupled to a second end of the coax cable and configured to convert the timing control signal to a DC signal.

18. The system of claim 17, further comprising a first inductor and a first capacitor coupled in series between the switch and the first end of the coax cable and a second capacitor, a second inductor, and a filter coupled in series between the second end of the coax cable and the detector.

19. The system of claim 17, wherein the base transceiver station is configured to generate the transmit/receive control signal as a DC signal that is not present in the first state and that is present in the second state.

20. The system of claim 17, further comprising a transmit power amplifier and a receive low noise amplifier both coupled to the detector, wherein when the DC signal is in the first state the transmit power amplifier is activated and when the DC signal is in the second state the receive low noise amplifier is activated.

* * * * *

UNITED STATES PATENT AND TRADEMARK OFFICE
CERTIFICATE OF CORRECTION

PATENT NO. : 7,656,957 B2  Page 1 of 1
APPLICATION NO. : 11/471887
DATED : February 2, 2010
INVENTOR(S) : Johnson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 738 days.

Signed and Sealed this

Twenty-eighth Day of December, 2010

David J. Kappos
*Director of the United States Patent and Trademark Office*